Nov. 5, 1940.   G. M. WEHNER   2,220,869
DRIVING BELT
Filed Feb. 18, 1939

Inventor:

Patented Nov. 5, 1940

2,220,869

UNITED STATES PATENT OFFICE 2,220,869

DRIVING BELT

Georg Max Wehner, Dresden, Germany

Application February 18, 1939, Serial No. 257,116
In Germany May 11, 1938

1 Claim. (Cl. 74—231)

This invention relates to an endless belt or band, particularly intended for crossed belt drives and produced from vegetable or animal fibrous material or other suitable material, as metal thread, by weaving, knitting or twisting.

When belts intended for open belt drives are used for crossed drives, they are more or less twisted between the pulleys or crossed if the shafts lying on different planes cross each other so that the belts are bent sideways on edge between the pulleys. The use of such belts made for open drives, which are crossed only at the place of application and whose ends are united by known means, is open to the objection that one edge thereof is expanded more than the other one during use and both strands, at the points of crossing, are subject to considerable friction and some displacement so that the belt pulls unevenly and wears out quickly. Although in crossed drives the provision of guide pulleys somewhat reduces the deflection of the belt, conditions are not much improved owing to increased friction.

A belt can properly engage a pulley only if it proceeds from a point located already in the plane of the pulley.

This is brought about according to the invention by twisting the endless woven, knit or plaited belt or band, and particularly the longitudinal fibres thereof, during production through a complete rotation.

In this way, a belt will run parallel to the pulleys or shafts a considerable distance before running on and will not be on edge at those points. Both edges are thereby uniformly stressed, and as the belt is not distorted it will engage the pulleys properly, the running-on side surrounding the arc of the pulley and being positioned in the center of the latter. This insures a better transmission of power and prevents premature wear of the belt, particularly because the crossed belt portions do not rub against one another or only to a slight extent. Belt lacers are dispensed with, and the belt runs much more smoothly.

The belt may also have the form of an endless band and serve for other purposes.

Figure 1:
Figure 2:

The invention is illustrated by way of example in the accompanying drawing, in which Figure 1 shows a crossed belt drive according to the invention;

Fig. 2 is a side view thereof, and

Figure 3:

Fig. 3, a front view thereof.

An endless belt or band according to the invention is produced by giving the thread or fiber system extending in longitudinal direction a full twist or turn of 360°, the whole rotation being effected either in one-half of the belt or half a rotation being effected in each half of the belt as shown in the drawing. The finished endless belt produced for instance by weaving runs flat at the two ends and at the crossings so that the parts of the belt around the pulleys, no matter whether it runs crosswise on parallel or more or less crossed drives, always lie parallel to the sides of the pulleys for quite a distance before passing on to the rim of the pulley, as indicated in Fig. 3.

I claim:

A woven endless flat driving belt, comprising a longitudinal thread system forming a warp and crossed within itself during production prior to weaving and a weft thread system combined with the warp system by weaving to form a flat crossed band whose inner side is invariably also its driving side.

GEORG MAX WEHNER.